United States Patent [19]
Walker

[11] Patent Number: 5,678,734
[45] Date of Patent: Oct. 21, 1997

[54] INSTANT HOT WATER DISPENSER

[76] Inventor: David Macallister Walker, 3 Hewston Close, Leicester LE12 8NE, United Kingdom

[21] Appl. No.: 545,635

[22] PCT Filed: Jun. 4, 1993

[86] PCT No.: PCT/GB93/01187

§ 371 Date: Oct. 25, 1995

§ 102(e) Date: Oct. 25, 1995

[87] PCT Pub. No.: WO94/21147

PCT Pub. Date: Sep. 29, 1994

[30] Foreign Application Priority Data

Mar. 25, 1993 [GB] United Kingdom ............... 9306254

[51] Int. Cl.⁶ ......................................................... B67D 5/62
[52] U.S. Cl. ......................... 222/146.5; 222/109; 222/424; 222/333
[58] Field of Search ............................... 222/64, 109, 183, 222/146.5, 333, 424, 479; 219/214, 441

[56] References Cited

U.S. PATENT DOCUMENTS

| | | | |
|---|---|---|---|
| 2,373,124 | 4/1945 | Le Frank | 222/424 |
| 4,077,545 | 3/1978 | Karls | 222/146.5 |
| 4,513,887 | 4/1985 | Wicke et al. | 222/146.5 |
| 4,990,746 | 2/1991 | Hammond | 222/146.5 |

*Primary Examiner*—Philippe Derakshani
*Attorney, Agent, or Firm*—Chilton, Alix & Van Kirk

[57] ABSTRACT

An instant hot water dispenser comprises a storage tank for containing a reservoir of hot water, heating means for maintaining the hot water at a predetermined temperature, a selectively operable discharge means associated with the tank having an outlet for connection with a remote discharge nozzle. The discharge means when operated is arranged to feed water from the reservoir through said outlet to the discharge nozzle, the dispenser being arranged to permit water to drain from the discharge nozzle into the reservoir when the discharge means is not operated. The discharge means is located relative to the tank such that water contained within the discharge means when not operated is maintained at said predetermined temperature.

20 Claims, 2 Drawing Sheets

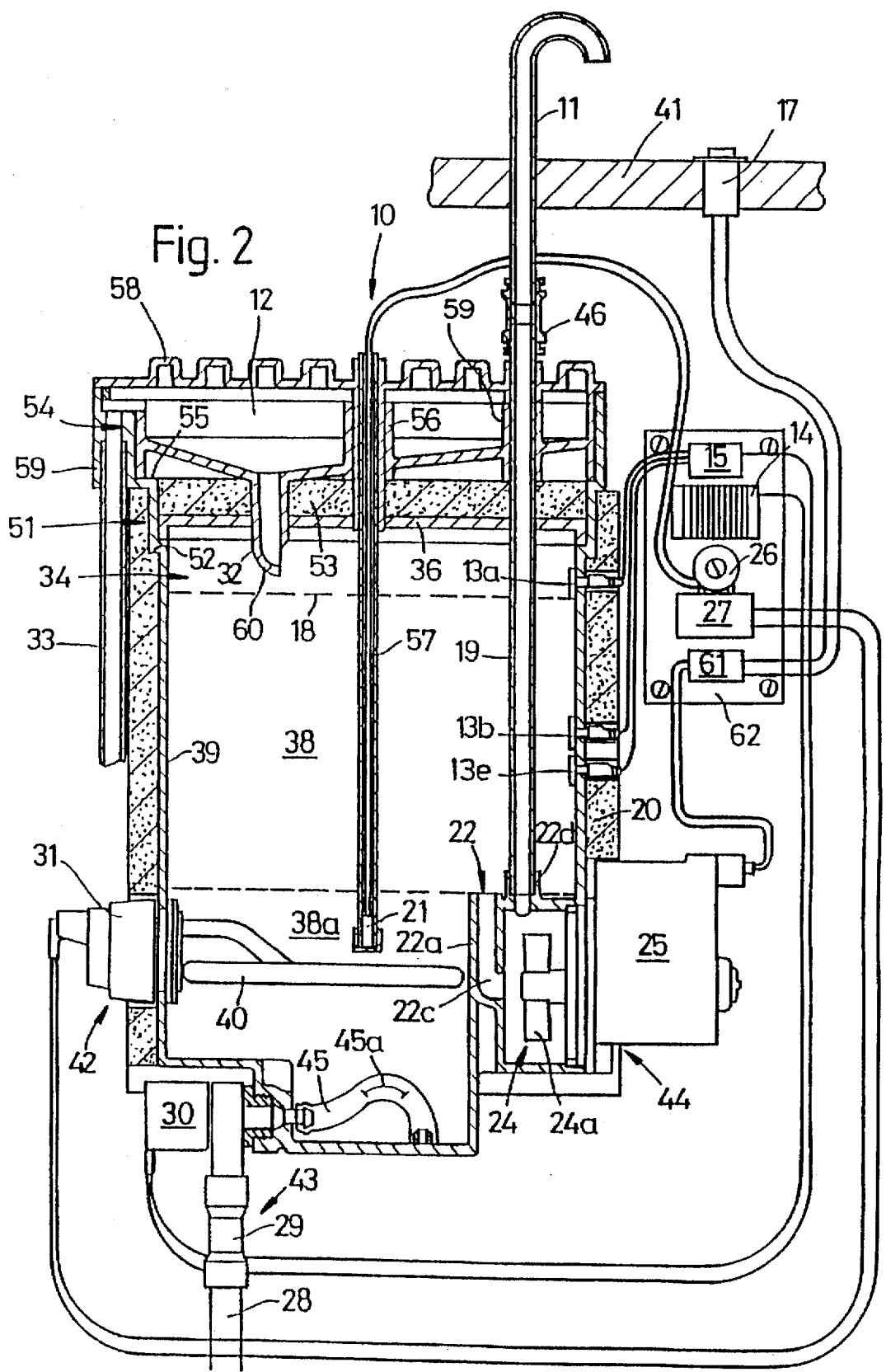

INSTANT HOT WATER DISPENSER

FIELD OF THE INVENTION

The invention relates to an instant hot water dispenser particularly, although not exclusively, an instant hot water dispenser for dispensing instant hot water for preparing hot drinks, for example tea or coffee.

Water generally suitable for preparing hot drinks is normally heated to boiling point by means of a kettle and often the person preparing a hot drink will have to wait until water in the kettle has boiled before the drink can be prepared. Therefore hot water is not instantly available with this type of system.

The present invention provides an instant hot water dispenser comprising a storage tank for containing a reservoir of hot water, heating means for maintaining the hot water at a predetermined temperature, a selectively operable discharge means associated with the tank having an outlet for connection with a remote discharge nozzle, the discharge means when operated being arranged to feed water from the reservoir through said outlet to the discharge nozzle, the dispenser being arranged to permit water to drain from the discharge nozzle into the reservoir when the discharge means is not operated, the discharge means being located relative to the tank such that water contained within the discharge means when not operated is maintained at said predetermined temperature, the tank being vented through an outlet port in an upper part thereof, and the outlet port communicating with a condenser.

Preferably the discharge means includes a submersible pump which communicates with said outlet.

Preferably said outlet is located above the level of the reservoir and is preferably connected to the submersible pump via a conduit which passes through the reservoir.

Preferably an inlet to the discharge means is located at a predetermined level above the bottom of the tank in order to define a lower level of the reservoir created by extraction of water by the discharge means.

Preferably the discharge means allow free-running of water through the discharge means thus enabling unused water to drain back into the tank from the discharge nozzle when the discharge means is not in operation.

United Kingdom Patent No. 1,191,848 discloses a water heater for a beverage dispensing machine. The water heater of this patent comprises a vessel containing water which is contained at a constant temperature. When hot water is required it is pumped through an outlet pipe which is arranged such that when the pump ceases to operate, the water in the outlet pipe will flow back to the vessel.

SUMMARY OF THE INVENTION

The condenser may sit on top of the tank or be incorporated within it. Conveniently, at least the top of the condenser is corrugated or otherwise formed to maximise the surface area thereof.

Preferably the heating means comprises an electric heating element located below the lower level of the reservoir.

Various aspects of the present invention will hereinafter be described with reference to the accompanying drawings, in which:

BRIEF DESCRIPTION OF THE DRAWINGS

FIG. 2 is a schematic diagram of an instant hot water dispenser according to a preferred embodiment of the present invention.

DESCRIPTION OF THE DISCLOSED EMBODIMENTS

Figure 1:
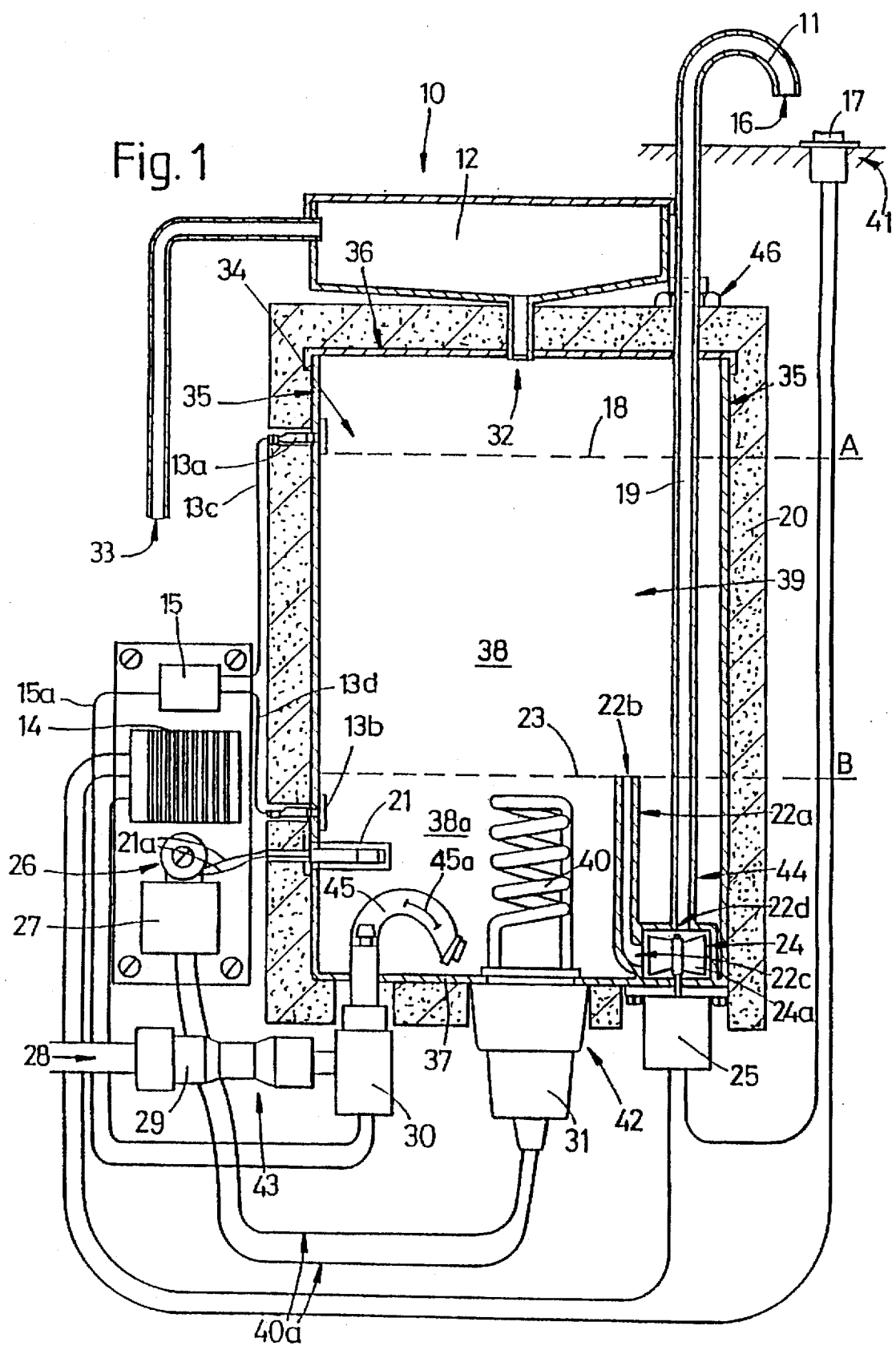
FIG. 1 is a schematic diagram of an instant hot water dispenser.

Referring to the drawings, there is shown an instant hot water dispenser 10 for heating water to a temperature suitable for the preparation of hot drinks which in the embodiment shown is located below a work surface/sink level.

The instant hot water dispenser 10 comprises a storage tank 39 moulded from a synthetic plastics material and defining a chamber 34 for containing a reservoir of hot water 38, heating means 42 for maintaining the hot water at a predetermined temperature, water supply means 43 for maintaining a readily available source of water to the storage tank 39, and selectively operable water discharge means 44 for removing hot water from the storage tank 39. The instant hot water dispenser 10 further comprises condensing chamber 12 for condensing steam from the storage tank 39 to be fed back as water, level sensors 13a,13b for detecting the level of water in the tank 39, and temperature sensor 21 with temperature controller 26 for measuring and controlling the temperature of water in the tank 39. The condensing chamber 12 also acts to vent the top of the storage tank 39 in a manner providing free passage of water into and out of the tank without interference by pressure or vacuum.

The instant hot water dispenser 10 has outer peripheral walls defined by a vertical cylindrical wall 35, base 37 and top 36. Preferably the outer walls of the storage tank 39 are surrounded by an insulating cladding 20 for example foamed plastics, providing economical running of the system by retaining heat within the chamber 34. The cylinder 35 may be of any convenient cross-sectional shape or size. For normal domestic use, it is envisaged that a storage tank 39 having a capacity of about 2 liters would be sufficient. The tank 39 may however have a capacity greater or less than 2 liters. The cylinder walls 35 are made from any suitable material such as plastics or a metal such as copper alloy.

Water is delivered to the storage tank 39 by the water supply means 43 having a water supply 28 terminating at an inlet of the storage tank 39. The water supply means 43 comprises a one-way valve 29 whose inlet is connected to the water supply 28 and an outlet connected to a solenoid operated valve 30. The solenoid valve 30 is preferably a coil type operating from a 12 volts source. The outlet of the solenoid valve 30 is connected to the inlet of the storage tank 39 preferably at the lowest position within the storage tank 39. The outlet of the solenoid valve 30 has a water distributor 45 in the form of a pipe internally located within the storage tank 39. This directs water into the tank through a slit 45a and preferably towards the heater element 40. The slit outlet 45a helps prevent build-up of scale which can get back to the valve 30 and block the same.

Hot water is discharged from the storage tank 39, on demand, by selectively operable discharge means 44 comprising a vertical discharge pipe 19 disposed within the chamber 34 of the storage tank 39 and being connected at a lower end to a submersible pump 24 and at the upper end to discharge nozzle 11.

The pump 24 is located at the base of the storage tank 39 having an inlet 22c and an outlet 22d. Pump inlet 22c is connected to a vertical pipe 22a whose inlet 22b draws water from a lower level B of water in the storage tank 39. The inlet 22b of pipe 22a is above the bottom of the storage tank 39 and defines the lower level B. The inlet 22b of pipe 22a and lower level B of the storage tank 39 are positioned above the heater element 40 such that the water is never allowed to fall below heater element 40 thus ensuring that the element is always fully immersed in water.

The outlet 22d of the submersible pump 24 is connected to the lower end of vertical discharge pipe 19 also located internally to the storage tank 39. The opposite end of the vertical discharge pipe 19 exits the top wall 36 of storage tank 39 through an outlet defined by a coupling 46 which forms an in-line communication passage through to the discharge nozzle 11. At the terminal end of the discharge nozzle 11 is the discharge pipe outlet 16.

A zone of water 38a surrounding the heater element 40 is defined by the volume of water contained under the lower level B in the storage tank 39.

The pump 24 preferably operates by means of a 12 volt motor 25 externally located at the base of the storage tank 39. The discharge of water is selectively operable by initiating a switch 17 that, in one state, causes the motor 25 to operate and hence turn the pump 24 to draw hot water from the volume of water 38a in the storage tank 39 through the intake 22b of inlet pipe 22a. Preferably the switch 17 is operated from a 12 volt supply. A discharge of hot water is forced up the discharge pipe 19 by initiating pump 24 and issues from the outlet 16 of the discharge nozzle 11 of discharge pipe 19. When the pump 24 is deactivated by operating switch 17 changing over to a second state the residue water remaining in the vertical discharge pipe 19 is allowed to drain back into the storage tank 39 by the venting at the top of the tank. Upon draining back into the storage tank 39 the water in the discharge means will assume the same level as the level of the water in the storage tank 39. The water remaining in the vertical discharge pipe 19 located inside storage tank 39 will thus be maintained at the same temperature as the water in the reservoir by conduction. This ensures that water in the discharge means is maintained at the storage tank water temperature such that when the discharge means 44 is operated, instant hot water at the desired temperature is immediately discharged through the nozzle. Preferably the 12 volts distributed to the solenoid valve 30, pump motor 25 and switch 17 are supplied from a 12 volt isolating transformer 14.

With the instant hot water dispenser 10 situated at a concealed location below the surface of a worktop/sink 41 the switch 17 and the outlet of the discharge pipe 19 may reside at an accessible location above the worktop 41.

The heater element 40 is preferably a 240 volt a.c. coil type electric element of 2.8 kw having a thermal overload cut-out switch 31 located in the head of the heater element 40. The heater element 40 is mounted on the central base 37 of the tank so as to be located below the inlet of the discharge means. Accordingly, if the tank is emptied to lower level B by the discharge means 44 the heater element 40 will always remain under water. In the event of the level dropping lower than lower level B the thermal overload cut-out switch 31 will prevent the heater element 40 from burning out. The heater element 40 is connected to a relay 27 by means of a pair of electrically conducting wires 40a.

A temperature controller 26 receives a temperature change signal by means of a pair of electrically conducting wires 21a the signal corresponding to the water temperature being sensed by temperature sensor 21. The temperature controller 26 is preferably an adjustable thermostat, but any other means may be used such as a resistance thermometer (thermistor) or a thermocouple. The water temperature set is dependent upon the desired requirement of the dispenser. For hot drinks, the temperature is preferably set in excess of 80° C., more preferably in excess of 90° C.

The temperature sensor 21 in the embodiment shown extends outward from the vertical side wall 35 of the storage tank 39 adjacent to, and occupying substantially the same zone of water 38a as, the heater element 40. Also adjacent to and occupying substantially the same zone of water 38a as the heater element 40 and the temperature sensor 21 is the pump 24 inlet pipe 22a.

Substantially towards the top of the storage tank 39 is a upper storage tank water level A and disposed between levels A and B are the level sensors 13a,13b respectively. The storage tank level sensors 13a,13b are situated in the vertical side wall 35 of the storage tank 39. The lower level sensor 13b is positioned above the temperature sensor 21 within the same zone 38a and at a lower distal region of lower level B. The upper level sensor is positioned within an upper distal region of upper level A.

The level sensors 13a,13b are electrically connected by wires 13c,13d to a level controller 15. The level controller 15 is electrically connected by wires 15a to the solenoid valve 30 in-line with the mains water inlet pipe 28.

When the water 38 demanded by pump 24 is caused to drop below level A the upper sensor 13a sends a signal to open the solenoid valve 30 via level controller 15. This open signal causes mains water to flow into inlet pipe 28 and replenish the storage tank 39 to maintain the correct upper level A. When the correct upper level A is reached the upper level sensor 13a causes the solenoid valve 30 to shut thus cutting the water supply off to the storage tank 39 at this desired level.

Located on the storage tank top 36 is the condensing chamber 12 moulded from a synthetic plastics material and having a water vapour/steam inlet pipe 32 and a vent pipe 33 which allows the tank to vent thereby providing an open system.

The condensing chamber 12 receives steam from inside the chamber 34 through an inlet pipe 32. The steam therein condenses and runs back down into the chamber 34. The vent pipe 33 not only allows the tank to breath as an open tank system but also serves as an overflow in the event of the solenoid 30 failing to shut off flow.

The condensing chamber 12 is preferably absent of any lagging or cladding as cooling the steam and condensing it to water to be received back into the tank would be greatly assisted by this feature.

Turning now to FIG. 2 which shows a preferred embodiment of the invention. This is generally similar to that of FIG. 1, whereby similar reference numerals have been used for like parts. The main difference between the embodiment of FIG. 1 and the preferred embodiment of FIG. 2 concerns the condensing chamber 12 which in the latter is incorporated within the top of the tank 39.

The tank 39 is moulded from a synthetic plastics material as before but has two portions of increased cross-section at its open end. A first portion 51 of increased cross section provides a lip 52 which forms a seat for the tank top 36 on which is disposed a layer insulating cladding 53 similar to the external cladding 20. A second portion 54 of increased cross section provides a further lip 55 which forms a seat for the condensing chamber 12, which again is moulded from a synthetic plastics material and has the vapour/steam inlet pipe 32 and a vent pipe 33 as before. The inlet pipe 32 is curved at the end located within the tank 39, the curved end acting as a baffle 60 to prevent undue egress of vapour/steam from the tank and hence prevent undue cooling of the water within the tank.

The condensing chamber 12 is moulded with a boss 56 offset to one side of the chamber, which boss receives a metallic pipe 57 in the lower of which is disposed the temperature sensor 21. A further boss 58 is provided to receive the discharge pipe 19 to which is releasably fitted the discharge nozzle 11.

The condensing chamber 12 is provided with a lid 58, also of a synthetic plastics material, which is of corrugated form so as to maximise the surface area thereof and hence maximise the cooling rate of the vapour/steam within the body of the condensing chamber. The lid 58 is screwed onto the tank 39 at a number of points around the periphery thereof at which points bosses are provided to receive self-tapping screws, or which may be threaded to receive conventional screws. The lid is apertured to allow the through passage of the discharge pipe 19 and the pipe 57.

The vent pipe 33 fits into a socket 59 moulded into the one side chamber 12.

The heater 40 is a conventional 2.5 kw heater, but may be a 2.8 kw heater as before. The heater 40 is mounted in the side of the tank 39 as is the pump 25 which in this embodiment is mains operated. The 12 volt switch 17 operates a relay 61 on the circuit board 62 which relay connects mains power (not shown) to the pump 25.

The water distributor in the form of the pipe 45 has one end connected to the solenoid valve 30 as before, and the other end attached to the floor of the tank 39, the outlet for the water again being in the form of the slit 45a.

In this embodiment the two level sensors 13a and 13b operate in conjunction with an earthed electrode 13e. In both embodiments, the sensors 13a and 13b, and the electrode 13e in the preferred embodiment, may be in the form of metallic strips of different lengths and located in generally vertical channels of dovetail cross section moulded into the sides of the tank 39. This dispenses with the need to provide apertures in the side of the tank 39.

The preferred embodiment of FIG. 2 operates in generally the same manner as that described in connection with the embodiment of FIG. 1.

In both embodiments, the discharge nozzle 11 may be in the form of a tap having an operating mechanism, such as a lever, which as well as opening the tap, actuates a microswitch to energise the relay 61, thus dispensing with the switch 17.

I claim:

1. An instant hot water dispenser comprising:

a storage tank for containing a reservoir of hot water;

heating means for maintaining the hot water in said reservoir at a predetermined temperature;

selectively operable discharge means associated with said tank, said discharge means having an outlet and a remote discharge nozzle connected to said outlet, said discharge means when operated, feeding water from said reservoir through said outlet to said nozzle, water being permitted to drain from said nozzle into said reservoir when said discharge means is not operated, said discharge means being located relative to said tank such that water contained within said discharge means when not operated is maintained at said predetermined temperature; and means for venting said tank, said venting means including an outlet port in an upper part of said tank and a condenser in fluid communication with said outlet port.

2. An instant hot water dispenser according to claim 1, wherein said discharge means includes a submersible pump which communicates with said discharge means outlet.

3. An instant hot water dispenser according to claim 2, wherein said dispenser means outlet is located above the level of said reservoir and is connected to said submersible pump via a conduit which passes through said reservoir.

4. An instant hot water dispenser according to claim 1, wherein said discharge means is provided with an inlet located at a predetermined height above the bottom of said tank in order to define a lower level of said reservoir created by extraction of water by said discharge means.

5. An instant hot water dispenser according to claim 1, wherein said discharge means allows free-running of water through said discharge means thus enabling water to drain back into said tank from said discharge nozzle when said discharge means is not in operation.

6. An instant hot water dispenser according to claim 1, wherein said discharge nozzle comprises a tap having an operating mechanism and an electrical switch, said switch being operated to actuate said discharge means when said tap is opened and to de-actuate said discharge means when said tap is closed.

7. An instant hot water dispenser according to claim 1, wherein said condenser is incorporated in said tank.

8. An instant hot water dispenser according to claim 1, wherein said condenser is separated from said tank by a layer of thermal insulation.

9. A instant hot water dispenser according to claim 1, wherein said condenser comprises a chamber fitted with a lid of corrugated formation.

10. An instant hot water dispenser according to claim 9, wherein said lid of said condenser also forms an overall lid for said tank.

11. An instant hot water dispenser according to claim 1, wherein said heating element located below the lower level of said reservoir.

12. An instant hot water dispenser according to claim 3, wherein said discharge means is provided with an inlet located at a predetermined height above the bottom of said tank in order to define a lower level of said reservoir created by extraction of water by said discharge means.

13. An instant hot water dispenser according to claim 12, wherein said condenser is incorporated in said tank.

14. An instant hot water dispenser according to claim 13, wherein said condenser is separated from the portion of said tank which holds said reservoir by a layer of thermal insulation.

15. An instant hot water dispenser according to claim 14 wherein said heating element located below the lower level of said reservoir.

16. An instant hot water dispenser according to claim 15, wherein said discharge nozzle comprises a tap having an operating mechanism and an electrical switch, said switch being operated to actuate said discharge means when said tap is opened and to de-actuate discharge means when said tap is closed.

17. An instant hot water dispenser according to claim 3, wherein said discharge nozzle comprises a tap having an operating mechanism and an electrical switch, said switch being operated to actuate said discharge means when said tap is opened and to de-actuate said discharge means when said tap is closed.

18. An instant hot water dispenser according to claim 17 wherein said heating element located below the lower level of said reservoir.

19. An instant hot water dispenser 3, wherein said discharge means allows free-running of water through said discharge means thus enabling water to drain back into said tank from said discharge nozzle when said discharge means is not in operation.

20. An instant hot water dispenser according to claim 12, wherein said condenser is exterior of said tank and is separated therefrom by a layer of thermal insulation.

* * * * *